Nov. 21, 1967  R. J. PRESTON  3,353,539
ELECTRICAL POWER GENERATOR EMPLOYING A BODY FLUID
AS ELECTROLYTE AND METHOD OF OPERATION
Filed Oct. 31, 1963  2 Sheets-Sheet 1
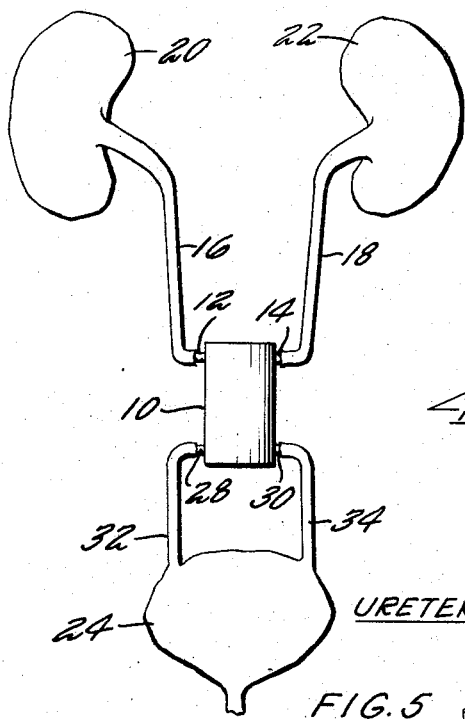
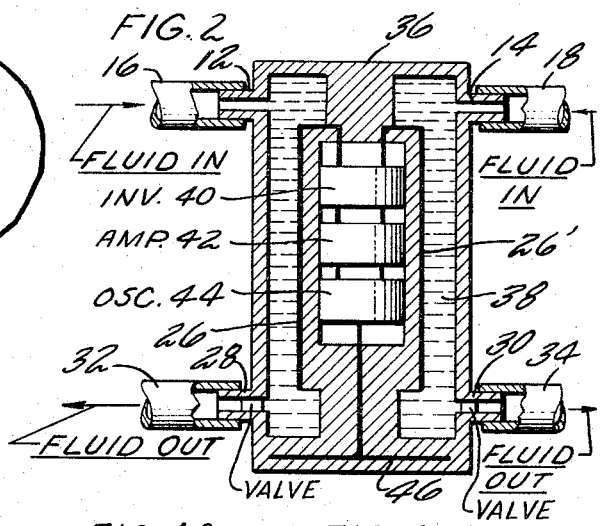
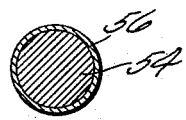
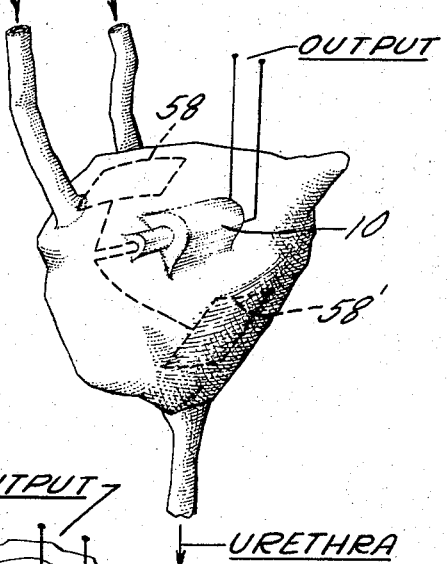
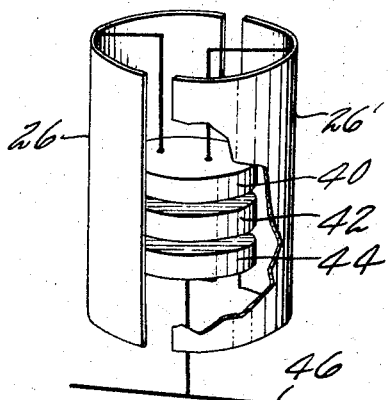
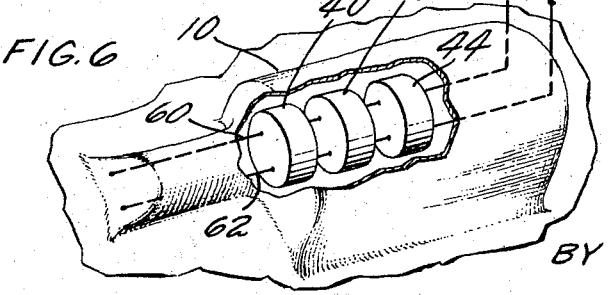
INVENTOR
RICHARD J. PRESTON
BY Donald J. Bradley
ATTORNEY INVENTOR
RICHARD J. PRESTON
BY Donald J. Bradley
ATTORNEY United States Patent Office 3,353,539
Patented Nov. 21, 1967

3,353,539
ELECTRICAL POWER GENERATOR EMPLOYING A BODY FLUID AS ELECTROLYTE AND METHOD OF OPERATION
Richard J. Preston, Springfield, Mass., assignor to United Aircraft Corporation, East Hartford, Conn., a corporation of Delaware
Filed Oct. 31, 1963, Ser. No. 320,390
9 Claims. (Cl. 128—419)

This invention relates to a biological power supply system and apparatus, and particularly to apparatus which may be implanted in the human body, and which utilizes bodily reactions or substances to produce electrical power.

Recent advances in medical science and technology, spurred on by the man in space programs, have shown that man's knowledge of man is small compared to man's knowledge of the world in which he lives. How man will react, both physically and emotionally, to the rigors of space travel and life on other planets, is the subject of much recent research. The need to know more about man's reactions to varying stimuli has led to the development of numerous monitoring devices for sensing man's reactions and reporting the data so it will be useful in increasing man's knowledge of man. One of the prime objectives in the recent series of manned orbital flights was to measure the reaction of the astronauts to high gravitational forces, zero G flight, cosmic radiation, and many other external conditions. This involved the use of monitors attached or connected to the body of the astronaut to measure parameters such as respiration rate, respiration volume, heart beat, body temperature, and many other bodily functions. For the most part, the transducers which sense the bodily functions are relatively crude devices which often cause discomfort to the astronaut.

To overcome the disadvantages of the present monitor devices, much recent work has been aimed at showing the feasibility of implanting these transducer or monitor devices within the body of the astronaut, and of telemetering the sensed body data to an outside receiver. See, for example, U.S. Patent No. 3,212,496 in which an implanted monitoring device is shown. These implanted transducers require power. This is true also of well-known devices such as the "Pacemaker" which supply regulated impulses to the heart to thereby stimulate the heart beat at a predetermined rate. The use of cadmium or other types of batteries implanted within the patient has proven unsatisfactory, since the batteries have a limited life and must be replaced at relatively frequent intervals, such relacement requiring surgery. The use of external power supplies has never practically been suggested due primarily to the possible sources of infection caused when the battery leads protrude through the human skin or tissue.

The apparatus and techniques disclosed herein make dynamic physiological monitoring unrestrictive by the elimination of cord connections, batteries or outside transponding mechanisms, between the creature monitored and the power source. Specifically, a new method of energy conversion has been developed whereby biological activity is used to aid in the generation of electrical power. One facet of this new "bio-power" concept is the use of biological substances at the electrodes of batteries or fuel cells to promote electro-chemical reactions. The biopromoters used may be either living organisms, such as bacteria, or non-living derivatives from biological systems such as enzymes. The advantages of bio-power as compared to conventional powered generators are numerous. First, less drastic reaction conditions are involved. The life processes occur only under relatively mild, natural conditions. This means that bio-powered devices will have a pH in the neutral range, a temperature near ambient and a dilute water solution as the medium. Second, not only will the conventional reactants be useful in bio-power production, but others that have never before been considered may be used. Organic materials such as sugars, starches, urine, alcohols and waste products may be used for fuel. Inorganic anions such as sulfate, nitrate and carbonate may also be considered as oxidants.

One aspect of this invention relates to a fuel cell or battery using body fluids to produce power. A fuel cell is basically a device which converts the energy of a chemical reaction between a fuel and an oxidizer directly into low voltage DC electricity. In one embodiment disclosed herein, urine is used as the electrolyte, with the miniature fuel cell or battery being implanted into or adjacent the bladder. The urea content decomposes into ammonia, and the ammonia is oxidized in solution to produce electrons. In another embodiment, peritoneal fluid, which is a saline solution, may also be used to produce the necessary power by implanting electrodes in the fluid within the peritoneal cavity. In this case the electrodes would enter into the electro-chemical reaction, and eventually be consumed.

A second aspect of this invention utilizes the fact that an electrical potential exists across a medium filled with specific types of bacteria. As bacteria consumes natural minerals and organic matter, they produce an electrial potential between any two locations in a culture. This process is a direct fuel to electricity system. Other work has shown that potential differences exist across portions of human waste, and that power can be drawn through electrodes placed therein which is a direct measure of the composition rate. In this embodiment, power is produced by surgically implanting electrodes in the lower intestinal tract of the patient and utilizing the potential differences across the lower intestinal tract due to the decomposing human waste to produce the necessary power.

It is therefore an object of this invention to produce an electrical power by utilizing the natural functions of the human body.

Another object of this invention is the production of electrical power by utilizing the fluids contained within the human body as electrolytes.

A further object of this invention is the production of electrical power by the implanting of electrodes within the human bladder, and utilizing urine as the electrolyte.

Another object of this invention is the production of electrical power by implanting electrodes within the peritoneum and utilizing the peritoneal fluid as an electrolyte.

A further object of this invention is the production of electrical power by utilizing the decomposition of human waste within the body.

Another object of this invention is the production of electrical power by connecting electrodes across the lower intestinal tract of a human.

These and other objects and an understanding of the invention may be had by referring to the following description and claims, read in conjunction with the accompanying drawings, in which:

FIGURE 1 shows a bladder fuel cell connected in the human urinary tract; and

FIGURE 2 is a schematic diagram of the fuel cell power unit of FIGURE 1; and

FIGURE 3 shows the construction of the electronic package; and

Figure 8:
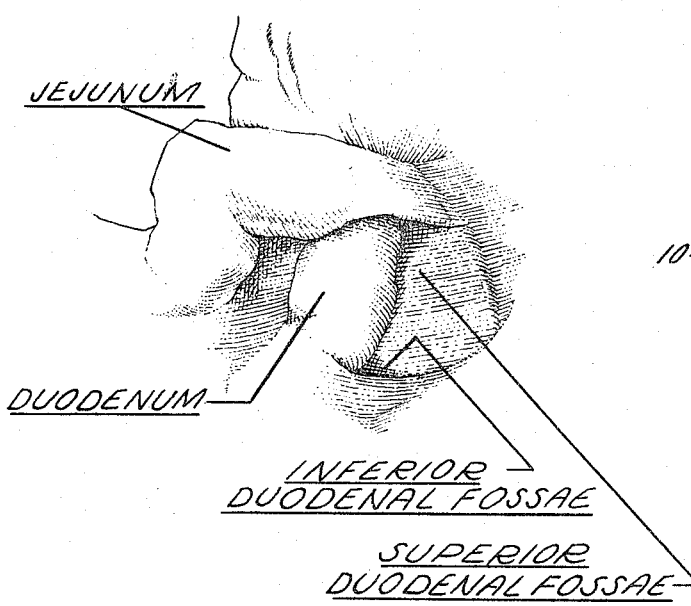
Figure 9:
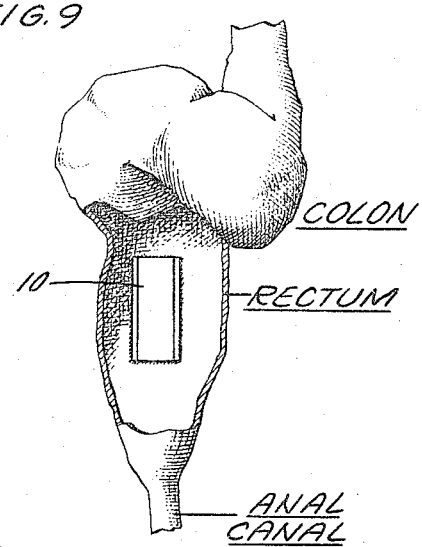
Figure 10:
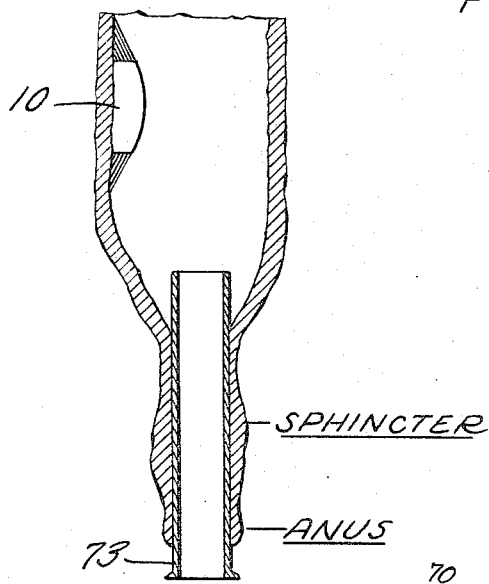
Figure 11:
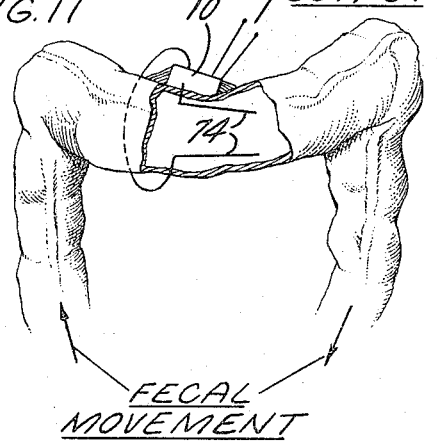
Figure 7:
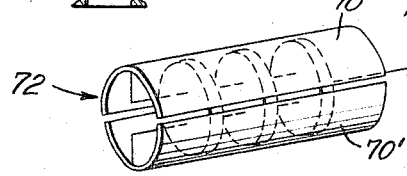

FIGURES 4A and 4B are modified electrode configurations for the bladder fuel cell; and FIGURE 5 shows a modified bladder fuel cell location; and FIGURE 6 shows the preferred power unit construction; and FIGURE 7 is a view of a peritoneal battery; and FIGURE 8 shows the preferred location in the human body of the peritoneal battery; and FIGURE 9 shows one configuration of an intestinal battery; and FIGURE 10 shows a method of installation of the intestinal battery of FIGURE 6; and FIGURE 11 shows a modified intestinal battery location.

There are many fluids within the body, and areas are available where these fluids can be tapped in large enough pools to be useful for implanting a rechargeable battery or fuel cell. The battery or fuel cell, depending upon the electrolyte and electro-chemical reaction, is rechargeable by the replacement of the electrolyte with fresh electrolyte after the reduction or oxidation takes place. In some areas such as the bladder, the urine can be utilized as such an electrolyte and the battery or cell designed with a feed-through so as to eliminate pockets of precipitate deposits or depleted fuel.

The major components of urine are soluble inorganic salts, organic metabolic end products and water. Table I gives a detailed list of the composition of typical normal urine.

*Table I.—The composition of typical normal urine*

| Constituent: | Amount (grams) |
|---|---|
| Water | 1000 |
| Solids | 60 |
| Urea | 30 |
| Uric acid | 0.7 |
| Hippuric acid | 0.7 |
| Creatinine | 1.2 |
| Indican | 0.01 |
| Oxalic acid | 0.02 |
| Allantoin | 0.04 |
| Amino-acid nitrogen | 0.2 |
| Purine bases | 0.01 |
| Chloride (as NaCl) | 12.0 |
| Sodium | 4.0 |
| Potassium | 2.0 |
| Calcium | 0.2 |
| Magnesium | 0.15 |
| Sulfur, total as S | 1.0 |
| Inorganic sulfates as S | 0.8 |
| Phosphate as P | 1.1 |
| Ammonia | 0.7 |

Using this data the electrolyte concentration of urine would be approximately .2 NaCl and .5 M urea. When freshly voided, the pH range is from 4.8 to 7.4 but usually is between 5.5 and 6.5, that is, usually slightly acidic. Upon standing, it loses $CO_2$ readily and the pH rises. After long standing it becomes more alkaline due to the decomposition of urea to $(NH_4)2CO_3$. Experiments on the use of urine as an electrolyte are normally based on the oxidation of urea. The basic equation is:

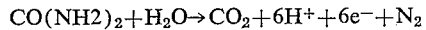

$$CO(NH2)_2 + H_2O \rightarrow CO_2 + 6H^+ + 6e^- + N_2$$

Calculations on the catabolism of urea show a yield of approximately .66 volt at a current density of .025 ampere per square centimeter of electrode area. This reaction would consume a 24-hour urine output of urea in $4 \times 10^6$ seconds or about 46 days.

FIGURES 1, 2, and 3 show one embodiment of a bladder fuel cell. In FIGURE 1, a cylindrical, plastic enclosed power unit 10 is shown connected through inlets 12 and 14 to the ureters 16 and 18 which connect each kidney 20 and 22 with the bladder 24. Within the power unit 10 are inserted the electrodes generally indicated at 26 and 26'. As the urine flows through the power unit 10, and comes in contact with the electrodes 26 and 26', electrical power is generated at the electrodes. Power unit outlets 28 and 30 connect the power unit 10 through ureters 32 and 34 to bladder 24.

Installation of power unit 10, as shown in FIGURE 1, obviously requries minor surgery, in that the two ureters connecting the two kidneys with the bladder must be cut, and the ureters connected to the power unit as shown. While not shown, it is clear that the power unit could be inserted in only one ureter, with a consequent reduction in the volume of urine available.

FIGURE 2 shows the exact structure of the power unit 10. A relatively stiff annular plastic shell 36 comprises the outside of the power unit. The material composing the shell 36 must be non-toxic and compatible with long-term implantation within the human body. It must also be firm enough to give support to the electrodes and electronics to be inserted therein, as will be described, but supple enough to provide some flexibility when subjected to outside stress. Many such materials are available, a preferred material being Dow Corning "Silastics." Between outer sheath 36 and the electrodes and electronic package is a fluid space 38. As the urine from the kidneys passes through the inlets 12 and 14, it is accumulated within the fluid space 38. Adjacent the fluid space, and contacting the urine within the space, are the electrodes 26 and 26'. The preferred composition of the electrodes is platinum for one of the electrodes, and platinum oxide for the other electrode, but it is apparent that other materials may be used. It is essential, however, that as large a surface area as possible be presented to the urine within the space 38 for contact with the electrodes. It is also apparent that the structure and composition of the electrodes and power unit is given only by way of example, and that numerous modifications may be made to suit the particular application. A sponge-like electrode, giving a large surface area per unit volume, would be ideal.

Within the center of the power unit 10, and surrounded by the electrodes 26 and 26', is the power unit electronics. As shown in FIGURE 2, the electrodes 26 and 26' are connected at one end to an inverter member 40 inserted within the center of the plastic sheath material 36. The inverter 40 may be of integrated circuitry or other miniature electronics. The function of the inverter is to convert the DC voltage across the electrodes into AC. For this purpose the actual electronics within the inverter may be very simple, and compatible with the use to which the AC voltage is intended. Voltage regulation may be included within the inverter, since the DC voltage produced across the electrodes will vary greatly within individuals, depending to a great extent upon the diet of the individual, the composition of the urine which varies with individuals and many other factors. Consequently, the desired ultimate power should be dependent upon the fact that a lower voltage may be available at some times than at other times.

The AC output from inverter 40 is shown feeding an amplifier 42 and an oscillator 44. An antenna 46 imbedded in plastic sheath 36 is connected to oscillator 44. The purpose of these components is to transmit through antenna 46 the power generated by the bladder battery to a monitor or other pickup unit located within the human body at a remote location without the necessity of running wires through the body. Oscillator 44 will convert the amplified inverter output into a high frequency AC signal which is transmitted from antenna 46 by means of a high frequency electromagnetic wave through the body to be picked up by the monitor or receiver. The monitor information may be modulated upon the received AC signal, and the modulated output again transmitted to a receiver outside the human body. It is obvious, however, that the AC inverter output may be used directly to power any desired unit without the necessity of the amplifier, oscillator or antenna.

It may be preferable to insert pressure-sensitive valves as shown in FIG. 2 within the annular fluid space 38 or at outlets 28 and 30. These valves would operate to allow the urine to flow to the bladder from the fluid space in the power unit only when the amount of urine within the fluid space 38 was sufficient to cover the electrodes 26 and 26'. This would insure that the electrodes would be covered by urine continuously, yet an increase in the urine supplied from the kidneys would not adversely affect the operation of the power unit.

The bladder fuel cells shown in FIGURES 1 through 3 utilize urine as the electrolyte, and has the advantage that the urine is periodically replenished by flow from the kidneys. It also has the advantage that the only necessary surgery is the cutting of the two ureters, and the suturing of the power unit into the ureters. The complete power unit package is plastic enclosed, and non-toxic to the system. The package itself contains the necessary electronics to convert the urine into the desired power. By means of the valves in the outlets of the power unit, normal urine flow to the bladder is not restricted in any manner.

There are two different chemical reactions which may take place at the electrodes depending upon the electrode materials. In the preferred reaction, the enzyme urease acts as a catalyst, and the electrodes take an active part in the reaction. FIGURE 4 shows the preferred composition of the electrodes to achieve the urease reaction. The anode configuration is shown in FIGURE 4a. The anode comprises a central core 48 of porous carbon. Impregnating and surrounding the core 48 as a thin coating is a quantity of platinum oxide (PtO) 50. A layer of crystalline urease 52 permeable to ammonia ($NH_3$), and to the urine solution is deposited around the anode but not through the pores in the carbon. The cathode, shown in FIGURE 4b, comprises a central core of porous carbon 54, impregnated and surrounded by a thin layer 56 of platinum (Pt).

The urease reaction converts the urea and the water by hydrolysis to ammonia and carbon dioxide. Thus two moles of ammonia are produced from one mole of urea. As shown by Table I, 30 grams of urea present in a 24-hour urine sample, converted to moles, would equal .5 mole of urea in each 24-hour period. This would be equal to one mole of ammonia per 24-hour period. In addition there is present in urine 0.7 gram ammonia as the free salt. The total amount available in 24 hours is therefore the sum of the amounts derived from the urea and from the ammonium salts, and equals 1.04 moles of ammonia per 24 hours. Each mole of ammonia represents three electro-chemical equivalents, and therefore the total amount of ammonia present in a 24-hour urine sample would then be 3.12 equivalents. Since there are 96,500 coulombs per equivalent, and 3.12 equivalents, the total amount of electrical energy available equals $3 \times 10^5$ coulombs. Assuming 100% efficiency, 3.4 amperes could be produced continuously for an entire day. However, it is apparent that nowhere near 100% efficiency can be obtained. In any case, sufficient current is available to produce adequate power even at a low efficiency. The complete urease reaction is shown below.

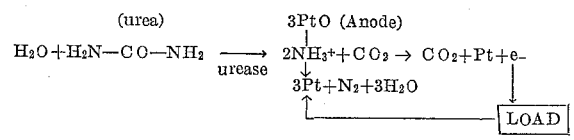

The anode, platinum oxide, enters into a reaction with the ammonia, while the carbon dioxide produces an electron for the load at the platinum electrode.

While not preferred, another reaction is possible at the electrodes without the use of the enzyme urease. In this case, the anode would consist of porous carbon with platinum-rubidium (PtRb) deposited thereon. The cathode would be porous carbon with platinum deposited thereon. The overall reaction in this case is:

$$3/2O_2 + CO(NH_2)_2 + 4H_2O \rightarrow N_2 + CO_2 + 6H_2O$$

and the two-half reactions involved:

Reaction at PtRb anode:

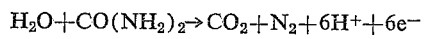

Reaction at Pt cathode:

In this reaction, oxygen enters the cathode and reacts with the water of the urine electrolyte utilizing the electrons furnished by the oxidation of urea. Hydroxyl ions are produced as a result. The half reaction occurring at the cathode consists of a consumption of oxygen and water and electrons to generate hydroxyl ions.

At the anode urea degradation proceeds with the liberation of electrons to furnish energy for the half reaction occurring at the cathode. Hydrogen ions produced at the anode neutralize the hydroxyl ions formed at the cathode. The breakdown of urea on the platinum-rubidium anode results also in the formation of the degradation products which are carbon dioxide and nitrogen gas.

The catalytic influence of the presence of rubidium in the anode makes possible the oxidation of urea at room temperature. Experimentation has shown that without this metal catalyst, no urea oxidation is detected. It is possible, however, that other metal catalysts may work as well or better.

In both reactions, none of the end products will have any toxic or adverse effect upon the patient. Carbon dioxide and nitrogen appear as gases, which will be passed at urination. Water will merely dilute the urine.

FIGURE 5 shows a modification of the bladder fuel cell in which the power unit 10 is sutured to the outside of the bladder, and which the electrodes 58 and 58' are implanted inside the bladder itself. The composition of the electrodes would be similar to those described previously. The power unit construction is shown in FIGURE 6. The power unit 10 in this case comprises a relatively flexible plastic or rubber sheath surrounding the electronics packages which include inverter 40, amplifier 42 and oscillator 44. Two leads, 60 and 62, are also sutured through the side wall of the bladder to connect the electrodes 58 and 58', inserted within the bladder, to the inverter unit 40. It would be necessary to suture the electrodes inside the bladder.

The advantage of this construction would be that a larger volume of urea would generally be available to produce the power. The disadvantage is obviously that more delicate surgery is required than with the previous method. The end use of the generated power would be similar to the previous method, that is, hard wires could be run from the inverter amplifier output to the unit requiring the power, or the oscillator 44 could provide energy to an antenna, the power then being radiated within the body to a receiver at a remote location.

FIGURES 7 and 8 show another embodiment of a battery which can supply power from a body fluid. In this case, peritoneal fluid is used as the electrolyte rather than urine.

The peritoneum is the smooth transparent serous membrane that lines the cavity containing the digestive organs and other viscera, and also encloses these organs. The peritoneum is not a smooth sheath, but contains many folds called fossae, and the peritoneum itself doubles back upon itself to completely surround many of the organs. The fluid within the peritoneum is a saline or salt solution.

FIGURE 7 shows the configuration of the peritoneal battery pack. The pack consists of a cylindrical plastic or rubber container, not shown, surrounding a pair of electrodes 70 and 70'. The electrodes are semi-cylindrical in shape, and mounted on the outside of the plastic material to allow complete contact with any fluid in which the entire battery pack is immersed. Inside the battery pack are the miniature electronics and the necessary antenna. The construction of the peritoneal battery pack is similar to that shown in FIGURE 3.

One of the electrodes is composed of rubidium, while the other is pure platinum. The rubidium reacts with the sodium chloride in the peritoneal saline solution to form rubidium chloride, water and a free sodium ion. These products in turn react to form sodium hydroxide, hydrogen, and a free electron which is attracted to the platinum electrode. The equation is:

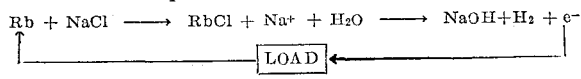

FIGURE 8 shows one possible location for the peritoneal battery pack shown in FIGURE 7. Since the peritoneum proper has many depressions or fossa, the battery may be inserted by the simple expedients of suturing the pack into the fossa, or by suturing the fold itself in such a way that the pack will not become free. FIGURE 8 shows a location at the superior duodenal fossa where the duodenum, or the first part of the small intestine leading from the stomach, contacts the jejunum or middle division of the small intestine between the duodenum and the ileum. Also shown as a possible location is the inferior duodenal fossa. The precise location will ordinarily depend upon size, shape and availability of fossae, which vary in individuals, as well as upon the proximity of the unit needing the power, and consequently any place within the peritoneal cavity where the battery pack will come in contact with the saline peritoneal fluid is a possible location. Again, either hard lines transmitting the power to the powered unit, or antenna transmission, may be used.

A novel intestinal battery is shown in FIGURES 9, 10, and 11. The structure of the power unit is similar to that described previously, that is, a pair of electrodes with a surface area as large as practical positioned to contact the electrolyte, the electrodes being deposited on a plastic or rubber material to give the electrodes structural rigidity, the material also serving as a housing for the necessary electronics.

An electrical potential exists across a medium filled with specific types of bacteria. As bacteria consume natural minerals and organic matter, they produce an electrical potential between any two locations in a culture. This process is a direct fuel to electricity system with the advantages of being compact, and having high efficiency and low weight. Potential differences also exist across portions of human waste, external to the body. Power can be drawn through electrodes placed therein which is a direct measure of decomposition rate.

These two previous areas of work have been combined to show that potential differences may also be measured in the lower intestinal tract across the decomposing human waste. Tests have been made on dogs by surgically implanting electrodes in the lower intestinal tract and making measurements of potential differences external to the dog while the animal is under anesthesia.

It is thus apparent that the bacterial content of the large intestine plus the presence of fecal matter makes the large intestine an ideal site for the collection of electrical energy.

FIGURES 9 and 10 show possible locations for the power unit 10. As shown in FIGURE 10, the power unit may be installed through a tube 73 which is inserted through the anus and sphincter into the rectum, and the power unit is sutured to the wall as high up in the large intestine as is possible. This method of insertion would avoid rupturing the wall of the rectum or large intestine to insert the power unit and electrodes therein. The location of the power unit should be as far up in the large intestine as possible due to the fact that the fecal matter becomes more dense as it proceeds down through the large intestines and into the rectum. The power unit in this case should be quite small and streamlined so that it does not block the passage of the fecal material.

Another possibility is surgical installation of the electrodes into the colon, preferably across the transverse portion thereof, with the power unit itself sutured to the outside of the colon. This is shown in FIGURE 11. In this case, hard wire leads from the power unit 10 are connected to electrodes 74 and 74', the electrodes being inserted at opposite sides of the transverse colon. Again the electrodes should have as large a surface area as possible, and may in fact be sutured to the colon wall at only one point, hanging downstream in the fecal flow.

Preferably, one of the electrodes in the intestinal battery is composed of platinum, while the other electrode is made of rubidium. The equation for providing power to the power unit is given as:

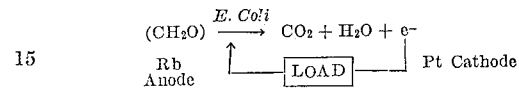

As with the other biological power supplies, the intestinal battery may require hard wire leads to the unit to which the power is being supplied, or the power may be supplied to the remote unit by means of an oscillator and antenna transmitting and receiving system.

It is apparent that the foregoing descriptions have been made only by way of example, and that numerous modifications may be made in the shape and arrangement of the parts, or the location of the power generating unit and electrodes themselves, without departing from the scope of the invention as hereinafter claimed.

I claim:

1. A method for generating electrical power comprising the steps of
    enclosing a pair of electrodes within a sealed container having an inlet and an outlet,
    implanting said container within a portion of a human body,
    causing a body fluid to flow into the container inlet, through the container, and from the container outlet, said electrodes being immersed in and separated by the body fluid within the container,
    producing a chemical reaction between said body fluid and said electrodes to generate a potential difference between said electrodes,
    and electrically connecting a load between said electrodes to produce power from said potential difference.

2. The method for generating power as in claim 1 in which the step of implanting said container includes the step of implanting said container in a ureter passage of the human body whereby said container inlet is connected to a kidney and said container outlet is connected to the bladder, urine from the kidney flowing through said container,
    said chemical reaction being produced between said urine and said electrodes.

3. The method for generating power as in claim 1 and including the steps of
    implanting an antenna adjacent said electrodes within the body,
    generating a high frequency electromagnetic wave form the potential difference across said load,
    connecting said antenna to said load,
    and radiating said wave from said antenna.

4. Apparatus for generating electrical power comprising
    a pair of electrodes,
    a container enclosing said electrodes and having an inlet and an outlet,
    means adapted to implant said container within a portion of a human body,
    means adapted to provide a flow of a preselected body fluid into said container inlet, through said container, and from said container outlet,
    means adapted to retain sufficient body fluid in said container to contact said electrodes, contact between said fluid and said electrodes producing a chemical reaction therebetween and generating a potential difference between said electrodes, and a load electrically connected between said electrodes for producing power from said potential difference.

5. Apparatus as in claim 4 in which said container is implanted within a ureter passage of the human body, said container inlet being connected through the ureter to a kidney and said container outlet being connected through the ureter to the bladder, urine from the kidney flowing through said container,
   said chemical reaction being produced between said urine and said electrodes.

6. Apparatus as in claim 5 in which said container comprises a relatively stiff, non-toxic enclosed plastic shell,
   a hollow fluid space within said container,
   and means for fixedly connecting said pair of electrodes within said container whereby both said electrodes are adjacent and in contact with said fluid space.

7. Apparatus as in claim 5 and including an oscillator and an antenna,
   means adapted to plant said oscillator and said antenna within the human body adjacent said container,
   means for connecting said load to said oscillator to generate an alternating high frequency power signal,
   and means for feeding said high frequency signal to said antenna whereby said signal is radiated from said antenna as electromagnetic energy.

8. Apparatus as in claim 5 in which one of said electrodes comprises a central core of porous carbon impregnated with and surrounded by platinum oxide, said platinum oxide being covered by a layer of crystalline urease, and in which the other of said electrodes comprises a central core of porous carbon impregnated with and surrounded by platinum.

9. Apparatus as in claim 5 in which one of said electrodes comprises porous carbon having platinum-rubidium deposited thereon, and the other of said electrodes comprises porous carbon with platinum deposited thereon.

References Cited

UNITED STATES PATENTS

| 3,047,789 | 7/1962 | Lowry | 321—36 X |
| 3,133,537 | 5/1964 | Muth | 128—2 |
| 3,133,872 | 5/1964 | Miller et al. | |

OTHER REFERENCES

"Business Week," May 6, 1961, p. 68.
"Electronics, Engineering Edition," Mackey et al., Jan. 3, 1958, pp. 51–53.

RICHARD A. GAUDET, *Primary Examiner.*

W. E. KAMM, *Examiner.*